US011638913B2

United States Patent
Rao et al.

(10) Patent No.: US 11,638,913 B2
(45) Date of Patent: May 2, 2023

(54) ENHANCING PHOTOCATALYTIC WATER SPLITTING EFFICIENCY OF WEYL SEMIMETALS BY A MAGNETIC FIELD

(71) Applicants: MAX PLANCK GESELLSCHAFT ZUR FÖRDERUNG DER WISSENSCHAFTEN EV, Munich (DE); JAWAHARLAL NEHRU CENTRE FOR ADVANCED SCIENTIFIC RESEARCH (JNCASR), Bangalore (IN)

(72) Inventors: Chintamani Nagesa Ramachandra Rao, Bangalore (IN); Claudia Felser, Dresden (DE); Catherine Ranjitha Rajamathi, Dresden (DE); Nitesh Kumar, Dresden (DE); Uttam Gupta, Bangalore (IN)

(73) Assignee: MAX PLANCK GESELLSCHAFT ZUR FÖRDERUNG DER WISSENSCHAFTEN EV, Munich (DE)

(*) Notice: Subject to any disclaimer, the term of this patent is extended or adjusted under 35 U.S.C. 154(b) by 0 days.

(21) Appl. No.: 16/969,841

(22) PCT Filed: Feb. 6, 2019

(86) PCT No.: PCT/EP2019/052874
§ 371 (c)(1),
(2) Date: Aug. 13, 2020

(87) PCT Pub. No.: WO2019/158414
PCT Pub. Date: Aug. 22, 2019

(65) Prior Publication Data
US 2020/0376470 A1 Dec. 3, 2020

(30) Foreign Application Priority Data
Feb. 14, 2018 (IN) .............................. 201811005625

(51) Int. Cl.
*B01J 27/051* (2006.01)
*B01J 23/20* (2006.01)
(Continued)

(52) U.S. Cl.
CPC ............. *B01J 27/051* (2013.01); *B01J 23/20* (2013.01); *B01J 27/195* (2013.01); *B01J 35/004* (2013.01); *B01J 35/0033* (2013.01); *C01B 3/042* (2013.01)

(58) Field of Classification Search
CPC ........ B01J 27/186; B01J 27/195; B01J 23/18; B01J 23/20; B01J 35/0033; B01J 35/004;
(Continued)

(56) References Cited

U.S. PATENT DOCUMENTS 6,632,332 B1 * 10/2003 Takaki ...................... B01J 19/10
422/186.01
10,090,466 B2 * 10/2018 Chan ......................... G01J 5/10
(Continued)

FOREIGN PATENT DOCUMENTS

EP 2407419 A1 1/2012
JP 2013-081874 * 5/2013 .............. B01J 35/02
(Continued)

OTHER PUBLICATIONS

Rajamathi et al., "Weyl semimetals as catalysts," retrieved from the Internet on Aug. 12, 2020, https://arxiv.org/abs/1608.03783v1, pp. 1-2 and pp. 8-9.
(Continued)

*Primary Examiner* — Patricia L. Hailey
(74) *Attorney, Agent, or Firm* — ProPat, LLC; Cathy R. Moore

(57) ABSTRACT

The present disclosure refers to increasing the catalytic efficiency of Weyl semimetals by subjecting Weyl semimetals to an external magnetic field of greater than 0 T, for
(Continued)

example greater than 0.1 T. In a preferred embodiment of the present disclosure the Weyl semimetal is selected from the group consisting of NbP, TaP, NbAs and TaAs.

11 Claims, 5 Drawing Sheets

(51) Int. Cl.
    *B01J 27/195*    (2006.01)
    *B01J 35/00*    (2006.01)
    *C01B 3/04*    (2006.01)

(58) Field of Classification Search
    CPC ............ B01J 19/087; B01J 37/342; B01J 2219/0093; B01J 2219/0803; B01J 2219/0852; C01B 3/042; C25B 1/02; C22C 27/02; C22C 45/10
    USPC ........ 502/5, 208, 353; 422/186.01; 420/425, 420/427, 579
    See application file for complete search history.

(56) References Cited

U.S. PATENT DOCUMENTS

| | | | |
|---|---|---|---|
| 2006/0137767 A1* | 6/2006 | Yamamoto | C22C 38/06 148/302 |
| 2012/0145532 A1 | 6/2012 | Smolyakov et al. | |
| 2015/0010463 A1 | 1/2015 | Bao et al. | |
| 2015/0259810 A1* | 9/2015 | Lewis | C25B 11/075 204/291 |
| 2017/0138844 A1* | 5/2017 | Xu | C22C 29/00 |
| 2019/0067547 A1* | 2/2019 | Gooth | H01L 35/14 |
| 2020/0024756 A1* | 1/2020 | Kress | C25B 1/04 |

FOREIGN PATENT DOCUMENTS

| | | |
|---|---|---|
| JP | 2013-081874 A | 5/2013 |
| WO | 2001/034300 A1 | 5/2001 |

OTHER PUBLICATIONS

Zhang et al., "Surface spintronics enhanced photo-catalytic hydrogen evolution: Mechanisms, strategies, challenges and future," Applied Surface Science, Nov. 2, 2017, vol. 434, pp. 643-668.
International Search Report for International Application PCT/EP2019/052874, filed Feb. 6, 2019.
Li, H., et al., "Activating and optimizing MoS2 basal planes for hydrogen evolution through the formation of strained sulphur vacancies," Nature Materials 2016, vol. 15, pp. 48-53.
Maitra, U., et al., "Highly Effective Visible-Light-Induced H2 Generation by Single-Layer 1T-MoS2 and a Nanocomposite of Few-Layer 2H-MoS2 with Heavily Nitrogenated Graphene," Angew. Chem. Int. Ed. 2013, vol. 52, pp. 13057-13061.
Rajamathi et al., "Weyl Semimetals as Hydrogen Evolution Catalysts," Advanced Materials, May 1, 2017, vol. 29, No. 19, pp. 1606202 (6 pages).
Tsai, C., et al. "Theoretical insights into the hydrogen evolution activity of layered transition metal dichalcogenides," Surface Science 640, Feb. 7, 2015, pp. 133-140.
Voiry, D., et al., "Conducting MoS2 Nanosheets as Catalysts for Hydrogen Evolution Reaction," American Chemical Society, Nano Letters 2013, vol. 13, pp. 6222-6227.

* cited by examiner

Magnetic Field

Without Magnetic Field

ENHANCING PHOTOCATALYTIC WATER SPLITTING EFFICIENCY OF WEYL SEMIMETALS BY A MAGNETIC FIELD

CROSS-REFERENCE TO RELATED APPLICATIONS

This application is being filed under 35 U.S.C. § 371 as a National Stage Application of International Application No. PCT/EP2019/052874 filed. Feb. 6, 2019, which claims priority to the following parent application: Indian Patent Application No, 201811005625, filed Feb. 14, 2018. Both International Application No. PCT/EP2019/052874 and Indian Patent Application No. 201811005625 are hereby incorporated by reference herein in their entirety.

FIELD OF THE INVENTION

The present disclosure pertains to technical field of photocatalytic water splitting. More particularly, the present disclosure pertains to methods of enhancing catalytic activity of Weyl semimetals, useful as catalysts in photocatalytic water splitting reactions for hydrogen production.

BACKGROUND

The background description includes information that may be useful in understanding the present invention. It is not an admission that any of the information provided herein is prior art or relevant to the presently claimed invention, or that any publication specifically or implicitly referenced is prior art.

The global energy challenge is universal, and a transfer to alternative sustainable energy sources, in particular the sun, is inevitable. Since solar energy is only available during daytime it would be highly advantageous to store the energy in an appropriate manner. Storage in the form of hydrogen would be a very attractive way to realize this. An ideal process for hydrogen production is to use water as a hydrogen source together with solar energy for conversion. Accordingly, photocatalytic water splitting (which is the light-induced conversion reaction of water to hydrogen and oxygen) has attracted attention as one of the most promising hydrogen production processes.

Efficient water splitting, using photocatalysts, has been a huge challenge for researchers. Moreover, water splitting by using a renewable form of energy is possibly the ultimate solution to environmental and energy issues. Nevertheless, the development of highly active photocatalysts for water splitting was hampered for a long time because of the difficulty of the thermodynamically uphill reaction. The focus on improving the materials by either engineering suitable structures, increasing the surface area, using co-catalysts to increase a material's efficiency are among the most common techniques. Current strategies for the catalyst design focus on increasing the number and activity of local catalytic sites, such as the edge sites of molybdenum disulfides ($MoS_2$) in the Hydrogen Evolution Reaction (HER).

EP2 407 419 A1 (whose United States equivalent is US 2013/0248349 A1) describes a solution by separating an oxygen evolution photocatalyst and a hydrogen evolution photocatalyst by an electrically conductive separator layer.

US2012/0145532 A1 discloses the use of wide-spectrum excitation of noble metal core/semiconductor shell hybrid nanoparticles for unassisted photocatalytic splitting of water. The metal core/semiconductor shell composite nanoparticles comprise a noble metal (e.g. Au, Ag, Pt, Pd, or noble metal alloy) core which is coated with a wide-bandgap semiconductor photocatalyst (e.g. $TiO_2$, ZnS, $Nb_2O_5$) transparent to optical excitation in the visible and near-infrared (NIR) spectral ranges, consistent with plasmon absorption bands of the metal core.

US2015/0010463 A1 relates to a photocatalyst for generating hydrogen from water using visible light irradiation comprising nanocrystalline cobalt (II) oxide nanoparticles.

H. Li, C. Tsai, A. L. Koh, L. Cai, A. W. Contryman, A. H. Fragapane, J. Zhao, H. S. Han, H. C. Manoharan, F. Abild-Pedersen, J. K. Norskov, X. Zheng (Nat. Mater. 2016, 15, 48); D. Voiry, M. Salehi, R. Silva, T. Fujita, M. Chen, T. Asefa, V. B. Shenoy, G. Eda, M. Chhowalla, (Nano Lett. 2013, 13, 6222) and U. Maitra, U. Gupta, M. De, R. Datta, A. Govindaraj, C. N. R. Rao (Angew. Chem. Int. Ed. 2013, 52, 13057) report that among photocatalysts for hydrogen production, $MoS_2$ nanoparticles demonstrate high efficiency to catalyze both photochemical as well as electrochemical HER.

C. Tsai, K. Chan, J. K. Nørskov, F. Abild-Pedersen (Surf Sci. 2015, 640, 133) found that metallic transition metal dichalcogenides (TMDs) are excellent candidates for HER.

Adv, Mater. 2017, 1606202, "Weyl semimetals as Hydrogen Evolution Catayśts" describes the transition-metal monopnictides NbP, TaP, NbAs, and TaAs as catalysts for HER. These monopnictides are topological Weyl semimetals.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability.

OBJECTS OF THE INVENTION

It is an object of the present disclosure to increase the efficiency of the Hydrogen Evolution Reaction (HER).

It is a further object of the present disclosure to increase the catalytic efficiency of catalysts for HER.

It is another object of the present disclosure to increase the catalytic efficiency of the transition-metal monopnictides NbP, TaP, NbAs, and TaAs as catalysts for HER.

It is yet another object of the present disclosure to provide a method for treating a Weyl semimetal in order to enhance its photocatalytic water splitting efficiency.

SUMMARY OF THE INVENTION

The present inventors found that the catalytic efficiency of Weyl semimetals can be increased by subjecting Weyl semimetals to an external magnetic field. Thus, one aspect of the present disclosure provides for a method of increasing the catalytic activity of Weyl semimetals by subjecting Weyl semimetals to an external magnetic field (>0 T). In one preferred embodiment of this aspect, the catalytic activity of a Weyl semimetal can be enhanced by exposing at least a portion of the Weyl semimetal to an external magnetic field having a magnetic field strength of >0.1 T. In a more preferred embodiment, the catalytic activity of a Weyl semimetal can be enhanced by exposing at least a portion of the Weyl semimetal to an external magnetic field of >0.3 T.

In a preferred embodiment of the present disclosure the Weyl semimetal is selected from the group consisting of NbP, TaP, NbAs, and TaAs.

Another aspect of the present disclosure relates to use of a Weyl semimetal with enhanced catalytic activity obtained by a method according to an embodiment of the present disclosure for the photocatalytic production of hydrogen from water.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION OF THE INVENTION

Figure 1:
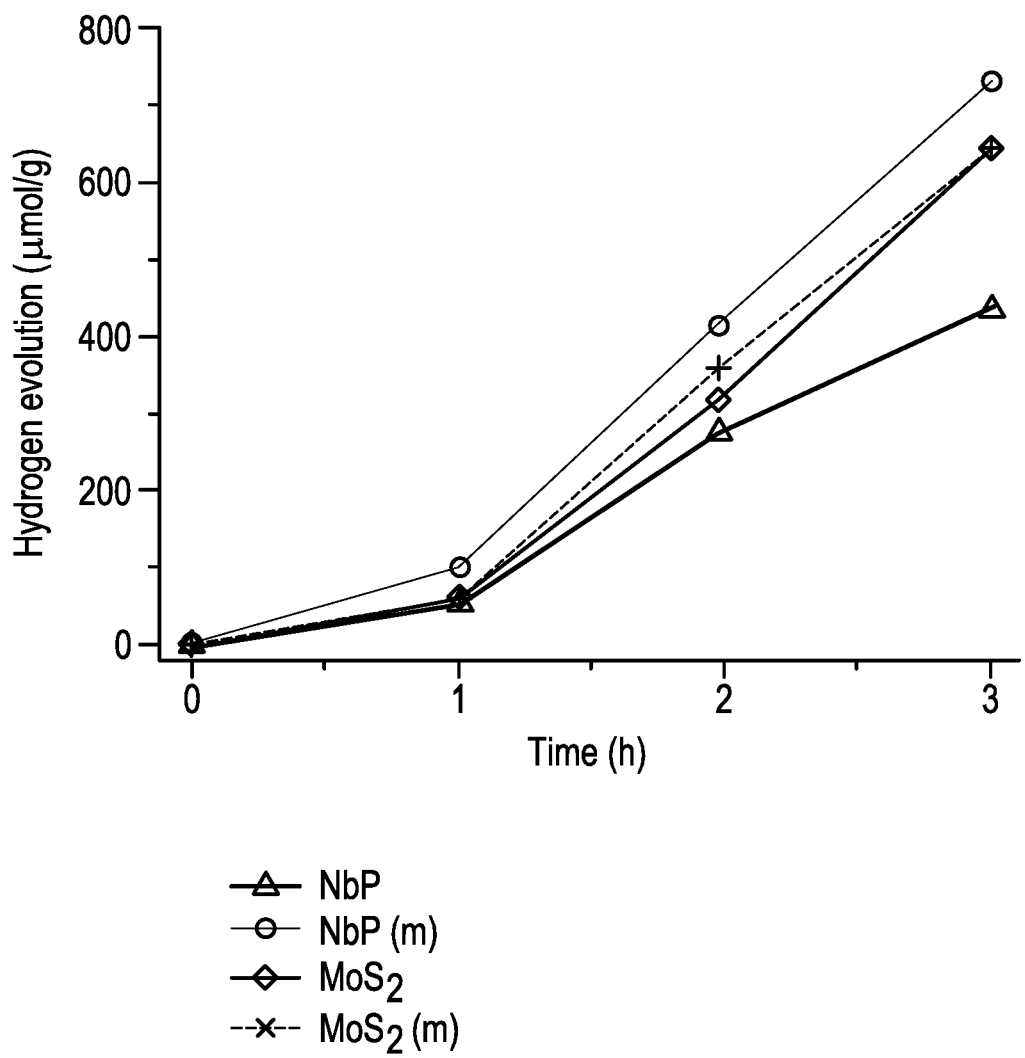
FIG. 1 shows a comparison of the HER catalytic activity of $MoS_2$ and NbP with (indicated with "m") and without external magnetic field.

The following is a detailed description of embodiments of the present disclosure. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Unless the context requires otherwise, throughout the specification which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein.

All methods described herein can be performed in suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

The headings and abstract of the invention provided herein are for convenience only and do not interpret the scope or meaning of the embodiments.

Various terms are used herein. To the extent a term used in a claim is not defined below, it should be given the broadest definition persons in the pertinent art have given that term as reflected in printed publications and issued patents at the time of filing.

A Weyl semimetal is a topological insulator. The prerequisite to a Weyl semimetal is an energy band inversion. Many compounds containing heavy metals show such a band inversion, more commonly referred to, as an inert pair effect. In a relativistic band structure, band crossing is forbidden such that, in topological insulators, a new bandgap opens, and a surface state with a Dirac cone electronic structure appears. Weyl semimetals appear at the borderline between topological and trivial insulators. In a Weyl semimetal, pairs of Dirac cones are formed in the bulk of the material where the number of Dirac cone pairs depends on the detailed symmetry of the particular metal or compound. Weyl semimetals also exhibit unusual surface states with open Fermi arcs.

NbP, TaP, NbAs, and TaAs are semimetals wherein Weyl points are located near the Fermi level with a total of 12 pairs of Weyl nodes in the first Brillouin zone.

Figure 2A:
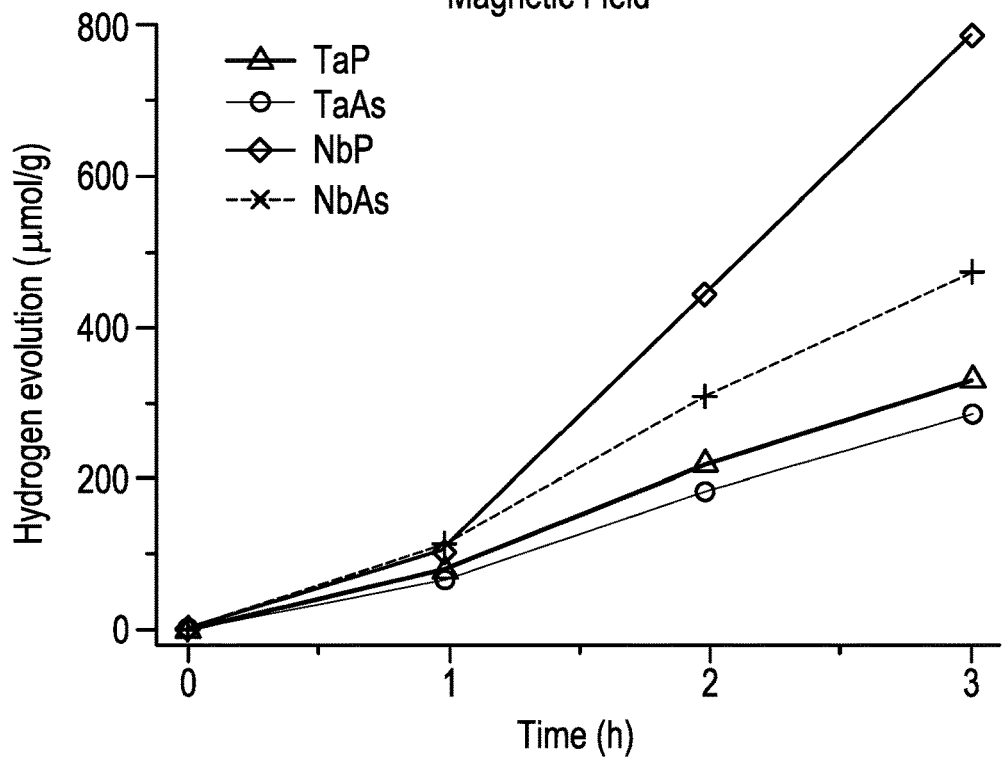
FIG. 2 includes two graphs, FIGS. 2A and 2B, which show a comparison of HER activities in the Weyl semimetals NbP, TaP, NbAs and TaAs, with applied magnetic field (FIG. 2A) and without magnetic field (FIG. 2B).
Figure 2B:
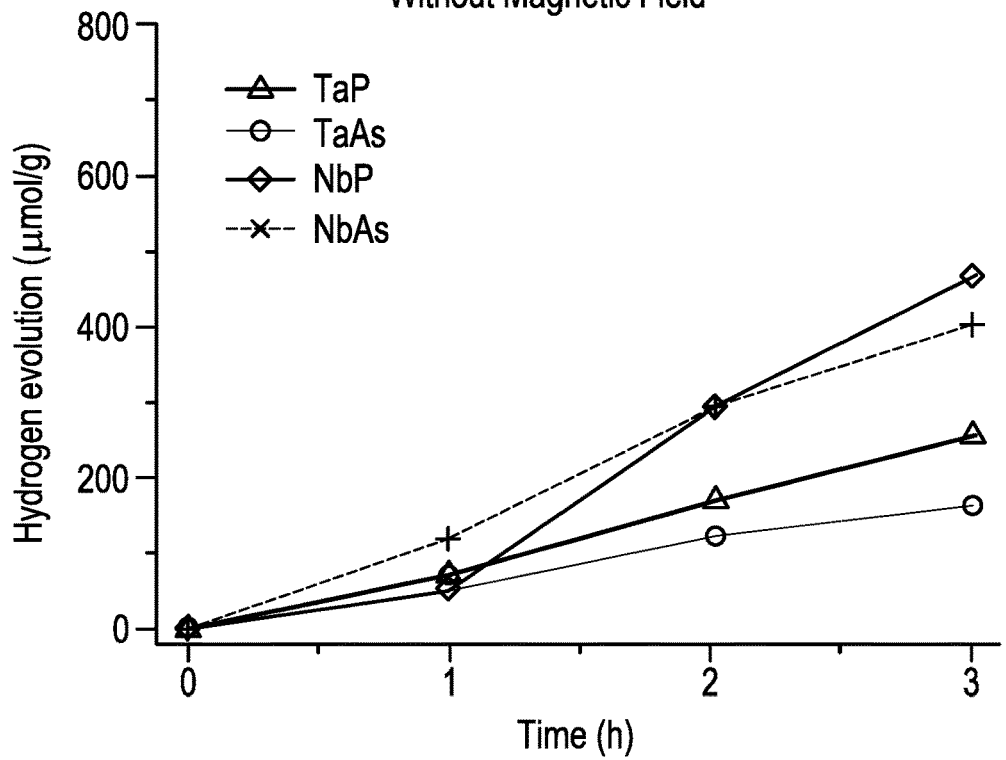

In HER, solar light is absorbed by photon capture systems, such as Eosin Y (EY). In the presence of a sacrificial agent, e.g. triethanolamine (TEAO), the resultant excited electrons can be transferred to the surface of a Weyl semimetal, leading to charge separation so that $H^+$ in the water is reduced to form $H_2$. While the above Weyl semimetals—as such—are already good catalysts for HER, it was surprisingly found that the catalytic HER efficiency of every single one of these Weyl semimetals could be increased even more in an external magnetic field of >0 T. In a field of 0.3 T the catalytic efficiency—measured as $H_2$ evolved in $\mu mol \cdot g^{-1}$ catalyst over time [hour]—is increased at least by 20%, preferably at least by 40%, more preferably at least by 50%, for some Weyl semimetals even up to about 70%. In particular, NbP encounters almost a doubling of the activity in the proximity of a permanent magnet at 0.3 T after 3 hours of HER. The activities of some Weyl semimetals in the presence (and absence) of an external magnetic field are shown in FIG. 2.

"In an external magnetic field" means in the proximity of a permanent or electro-magnet, such that the catalytic material experiences a magnetic field of >0 T, preferably >0.1 T, more preferably ≥0.3 T; of course it is meant that the applied external magnetic field is stronger than the magnetic field of the earth (which is between about 20 to 50 µT). While at least part of the surface of the catalytic material should be exposed to the magnetic field, it is preferred that the whole catalytic material, i.e. at least 70%, more preferably at least 90% of the catalytic material is exposed to the magnetic field of >0 T, preferably >0.1 T, more preferably >0.3 T.

Among photocatalysts for hydrogen production, $MoS_2$—a conventional, topologically trivial catalyst—was reported to demonstrate high efficiency to catalyze both photochemical as well as electrochemical HER. However, $MoS_2$ showed almost no change in the catalytic behavior when exposed to an external field (see FIG. 1). The magnetic field influences only the Weyl semimetals. $MoS_2$ shows a catalytic activity of about 625 µmolg$^{-1}$ in the absence as well as in the presence of a magnetic field (0.3 T. 6 hours). With TaP as electrocatalyst, the catalytic efficiency is increased by 34% with a magnetic field of 113 Oe.

The manufacture of the Weyl semimetals may comprise providing the metal (Ta, Nb) powder and Arsenic powder in an equimolar ratio; heating the mixed powders to form a polycrystalline binary 1:1 pnictide; sealing the polycrystalline pnictide and a transfer agent, e.g. $SnI_4$ or $TeI_4$, in a first end of a closed ampule; and heating the closed ampule to about 800° C. at the first end and to about 1000° C. at a second end of the ampule to produce a temperate gradient along a length of the closed ampule to grow the pnictide Weyl semimetal crystals via a chemical vapor transfer (CVT) reaction. The corresponding Phosphorous containing compound can be prepared by a solid state reaction at temperatures ranging from 800° C. to 1100° C.

EXAMPLES

The invention is explained in more detail below with reference to examples. The present disclosure is further explained in the form of following examples. However, it is to be understood that the foregoing examples are merely illustrative and are not to be taken as limitations upon the scope of the invention. Various changes and modifications to the disclosed embodiments will be apparent to those skilled in the art. Such changes and modifications may be made without departing from the scope of the invention.

Manufacture of TaAs 3.536 g Tantalum powder (purity: 99.98%) and 1.464 g Arsenic powder (purity: 99.999%) were weighed to yield a 5 g (1:1 molar ratio) mixture. The mixture was filled in a silica tube. The evacuated tube (pressure <1 Pa) was then sealed and heated in an electric furnace at 600° C. for 36 hours. Thereafter the temperature was slowly increased from 600° C. to 1050° C. within 50 hours, and kept at 1050° C. for 36 hours.

300 mg of the resulting polycrystalline TaAs and 60 mg $SnI_4$ were placed at the bottom of a silica ampule. Then, the silica ampule was evacuated and fluxed with argon (99.999%) and again evacuated (pressure <1 Pa) and sealed. The closed ampule was then placed into a three-zone furnace. The end of the closed ampule containing the polycrystalline TaAs was within the first zone and the opposite end of the ampule was in the third zone. The second (middle) zone was between the first and third zone. The first zone containing the polycrystalline TaAs was set at 800° C. and the middle zone was set as 1000° C. The CVT reaction time is 170 hours. TaAs single crystals were formed at the middle to the end of the silica ampule which did not contain the polycrystalline TaAs.

The single crystals were crushed using a pestle and mortar and separated using a 20 µm sieve.

Manufacture of NbAs

NbAs was manufactured in the same way as described above for TaAs from a stoichiometric mixture of the elements Niobium and Arsenic.

Manufacture of NbP, TaP and $MoS_2$

NbP, TaP and $MoS_2$ were grown by solid state reaction (same as for TaAs but no CVT) from a stoichiometric mixture of the elements.

All compounds were characterized by XRD.

HER Experimental Setup

Figure 4:
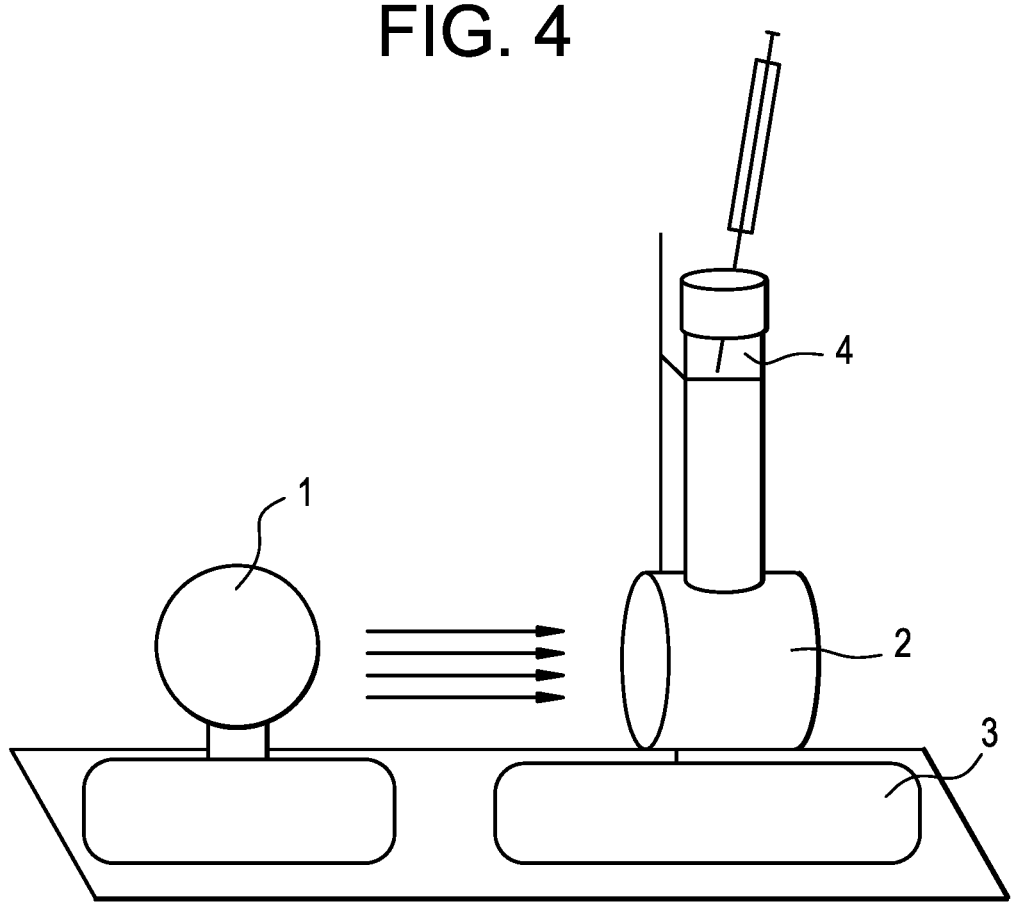
FIG. 4 shows an exemplary experimental set-up for the production of hydrogen through photocatalytic water splitting in accordance with an embodiment of the present disclosure.

The experiment setup is shown in FIG. 4 and consists of an assembly consisting of a halogen bulb (1), the reaction vessel (2) and the Pair of permanent magnets (3). The halogen bulb (1) was placed in line with the glass reaction vessel (2) and the magnet (3) was placed below the reaction vessel (2). The evolved $H_2$ was collected from the headspace (4) of the vessel (2) at 1-hour intervals and analyzed using thermal conductivity detector in Perkin Elmer 580C gas chromatograph.

Experimental Details

In a glass vessel, 3-4 mg of the catalyst were dispersed in 50 mL of water containing triethanolamine (TEAO). The glass vessel with the sample was placed directly over a NdFeB magnet (see FIG. 4, two bar magnets glued to each other, B~3000 Gauss). Eosin Y dye was added to the mixture before starting the reaction.

After performing the experiment in the presence of the magnetic field, the control reaction in the absence of the magnetic field was carried out. All measurements were done at room temperature (about 23° C.) and repeated thrice for reproducibility.

FIG. 1 shows a comparison of the HER catalytic activity of $MoS_2$ and NbP with (indicated with "m") and without external magnetic field. The activity of topologically non-trivial NbP increases significantly upon the application of an external magnetic field (NbP (m)) whereas the activity of topologically trivial $MoS_2$ does not vary much ($MoS_2$ (m) and $MoS_2$).

FIG. 2 shows a comparison of HER activities in the Weyl semimetals NbP, TaP, NbAs and TaAs
(Graph a) with applied magnetic field and
(Graph b) in the absence of magnetic field.

The activity (after 3 hours) of NbP, TaP, TaAs and NbAs increases from 420, 220, 180 and 390 µmolg$^{-1}$ to 720, 320, 280 and 450 µmolg$^{-1}$ respectively in an external magnetic field of 0.3 T.

Figure 3:
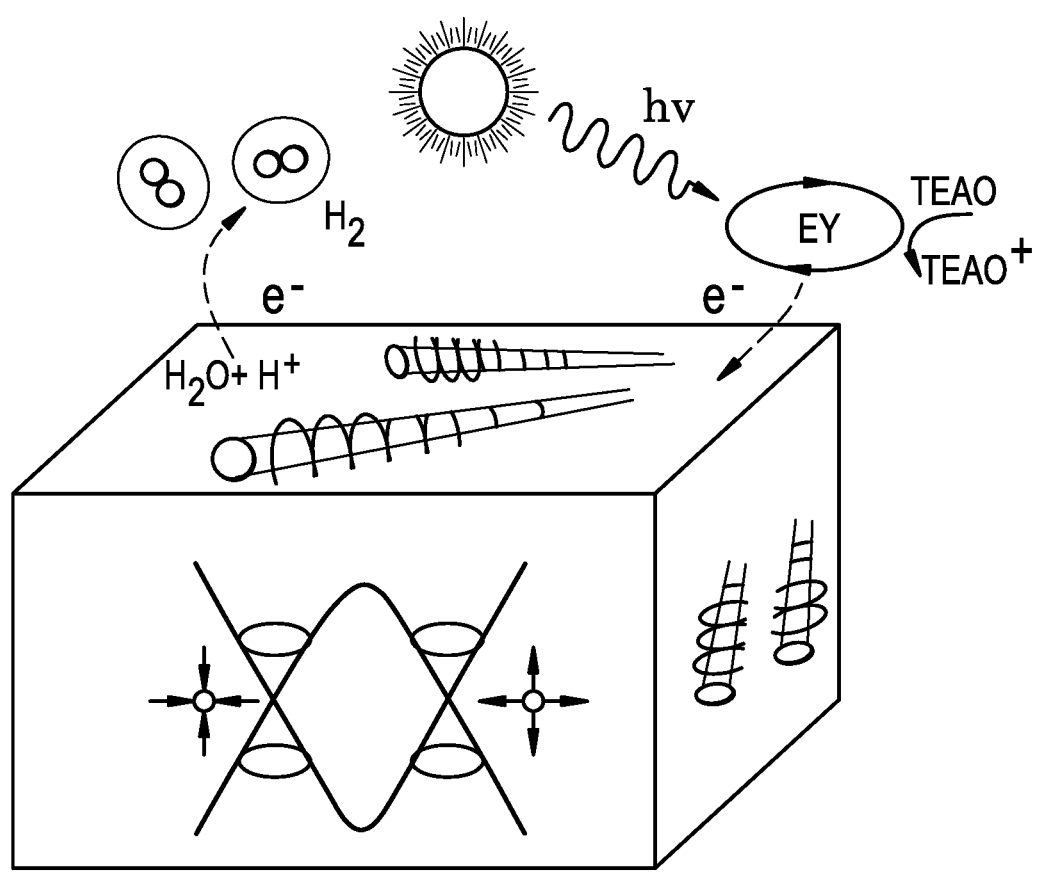
FIG. 3 is a schematic diagram of a Weyl semimetal for catalyzing the dye-sensitized hydrogen evolution.

FIG. 3 is a schematic diagram of a Weyl semimetal for catalyzing the dye-sensitized hydrogen evolution. When light falls upon Eosin Y it is excited and, in the presence of the sacrificial agent triethanolamine (TEAO), the dye transfers an electron to the surface of the Weyl semimetal, leading to charge separation, and, thereby, reducing water (H+ in H2O) to hydrogen.

Figure 5:
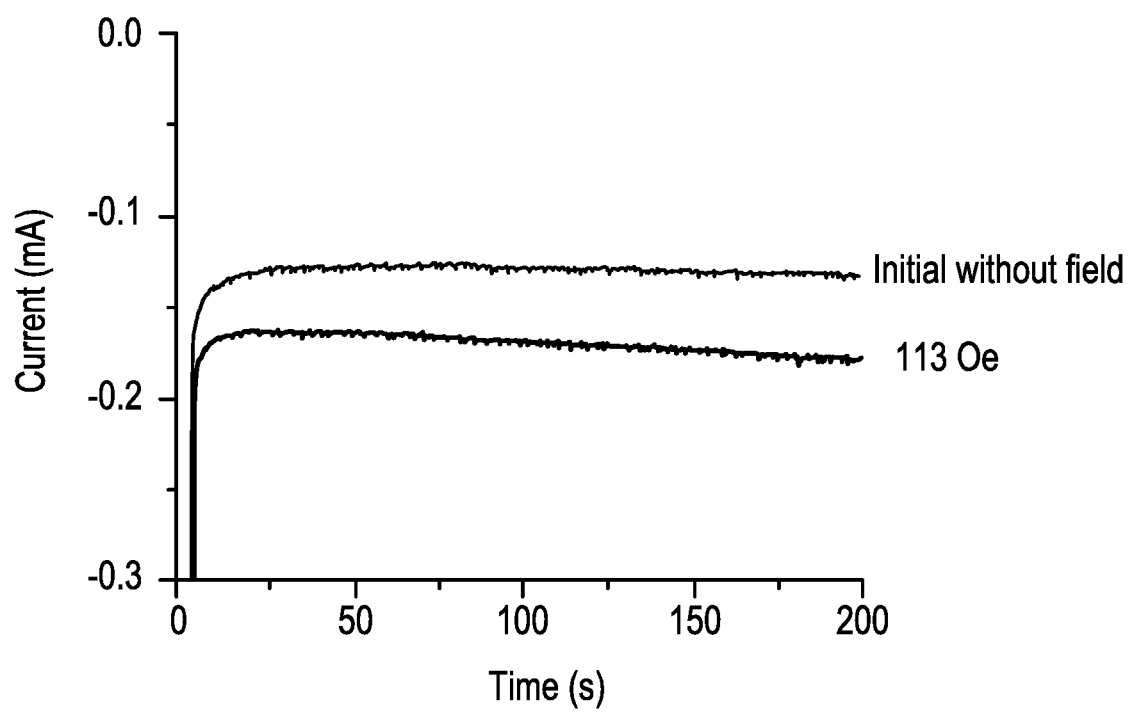
FIG. 5 shows the catalytic activity of the Weyl semimetal TaP as electrocatalyst for HER, with and without a magnetic field.

FIG. 5 shows the catalytic performance of TaP as catalyst for HER. A potential of −0.36V vs Reversible Hydrogen Electrode (RHE) is used in the measurement. When no magnetic field is applied, a current of 0.129 mA is observed. When applying a magnetic field of 113 Oe, the current is increased to 0.172 mA. This corresponds to an efficiency increase of 34%.

The invention claimed is:

1. A photocatalyst comprising a magnetized Weyl semimetal in a magnetic field of >0 T said magnetized Weyl semimetal exhibiting an increased photocatalytic efficiency for a photocatalytic Hydrogen Evolution Reaction (HER) in comparison to said Weyl semimetal in the absence of said magnetic field.

2. The photocatalyst comprising the magnetized Weyl semimetal according to claim 1, wherein the photocatalytic efficiency is increased by at least 20% compared to the catalytic efficiency without application of a magnetic field.

3. The photocatalyst comprising the magnetized Weyl semimetal according to claim 1, wherein the Weyl semimetal is selected from one or more compounds of the group consisting of NbP, TaP, NbAs, and TaAs.

4. Method of increasing the photocatalytic efficiency of the photocatalyst comprising Weyl semimetal of claim 1, comprising subjecting the Weyl semimetal to an external magnetic field of >0 T.

5. The method according to claim 4, wherein the Weyl semimetal is selected from one or more compounds of the group consisting of NbP, TaP, NbAs, and TaAs.

6. The method according to claim 4, wherein the photocatalytic efficiency in a Hydrogen Evolution Reaction is increased by at least 20%.

7. The method according to claim 4, wherein the external magnetic field is >0 T to 0.3 T.

8. The photocatalyst comprising the magnetized Weyl semimetal according to claim 1, wherein the photocatalytic efficiency of the magnetized Weyl semimetal is increased by at least 40% within the magnetic field at 0.3 T compared to the catalytic efficiency without application of the magnetic field.

9. A photocatalytic hydrogen evolution reaction (HER) apparatus comprising (i) an aqueous dispersion of a magnetized Weyl semimetal contained within a HER reaction vessel; (ii) a pair of permanent magnets disposed below the HER reaction vessel, and (iii) a headspace collection port.

10. The photocatalytic HER apparatus according to claim 9, wherein the HER reaction vessel is a glass vessel and a magnetic field is generated from magnets consisting of the pair of permanent magnets disposed below the HER reaction vessel.

11. A Hydrogen Evolution Reaction (HER) catalyst comprising a magnetized Weyl semimetal, said magnetized Weyl semimetal exhibiting an increased photocatalytic efficiency of HER in comparison to said Weyl semimetal in the absence of said magnetic field,
wherein the magnetic field is >0 T to 0.3 T.

* * * * *